(No Model.)
C. L. RIKER.
HEAT REGULATOR.
No. 318,393. Patented May 19, 1885.
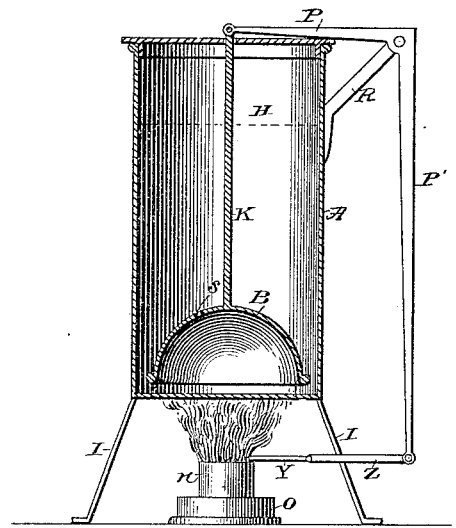
Witnesses:
Geo. W. Wallace
H. M. Potter
Inventor:
Carroll L. Riker
by John P. Adams
his Attorney in fact

UNITED STATES PATENT OFFICE.

CARROLL L. RIKER, OF NEW YORK, N. Y., ASSIGNOR TO C. GULLMAN, OF SAME PLACE.

HEAT-REGULATOR.

SPECIFICATION forming part of Letters Patent No. 318,393, dated May 19, 1885.

Application filed November 1, 1881. (No model.)

*To all whom it may concern:*

Be it known that I, CARROLL L. RIKER, a citizen of the United States, residing in the city, county, and State of New York, have invented certain new and useful Improvements in Heat-Regulators, of which the following is a specification.

The principal object of my invention is to furnish a sensitive but reliable motive power, (which can be applied to many forms of heat-regulators now in use, instead of the motive power now used therein,) and also several means or devices for applying such motive power to regulate heat.

My invention consists, chiefly, in accumulating the vapors of any liquid or semi-fluid whose boiling-point is to be the heat required under or partially below the level of its surface and employing the tendency of such confined or submerged vapor to rise to the surface, or, more properly stated, the hydrostatic pressure exerted upon it, (the vapor,) as a motive power to govern the heat supplied.

A vertical section is shown in the drawing. A lamp is used as the heating device.

A is a vessel containing water up to level H. B is a vessel for collecting the vapor, of suitable shape. K is a rod which connects it with bell-crank lever P, which in turn is supported on bracket R and engages one end of the rod Z, which in its turn engages with the movable burner-cap Y of the burner *n* on lamp *o*. I I are supports for vessel A. If, now, the lamp *o* be lighted, when the water in A begins to boil the rising bubbles of steam will collect under B, thereby causing it to rise toward the surface of the water in A, raising the arm of bell-crank lever P, and consequently sliding the burner-cap Y over the flame so as to almost extinguish it. When the steam in B condenses, B will descend and through its connections remove the burner-cap. This action may be continuous, and the escape of vapor from the liquid in A will be very slight.

In the device herein shown it is not necessary that there should be the exact quantity of water therein indicated, as the same result will be attained, provided there is always some liquid in the bottom of vessel A above the bottom of the vapor-accumulator.

For the purpose of securing rapid condensation, I may perforate the accumulator B with one or more holes, as shown at S.

It is obvious that other ordinary and well-known devices may be used in constructing an automatic cut-off, and I do not confine myself to the particular device shown for that purpose.

I am aware that in the patent to Huch for an improvement in coffee-pots, No. 134,603, dated January 7, 1883, a vessel is shown with a lid or cover having a rim or flange dipping downward into a water-trough, in which an accumulation of steam presses the liquid in the vessel against the cover, floats it, and thereby actuates an automatic device for lessening the flame which produces the heat; but this involves a loosely-fitting cover and consequent loss of vapor and aroma, while in my invention the vapor accumulates under a submerged accumulator and actuates the automatic cut-off by means of a rod closely fitting a perforation in the lid, which may be tight-fitting. I do not therefore claim, broadly, a vessel in which an automatic cut-off is actuated by the force of accumulated vapor.

Having thus described my invention, what I claim as new, and desire to secure by Letters Patent, is—

In combination with a vessel containing liquid desired to be kept at or near its boiling-point, the submerged accumulator B and connecting-rod K, operating an automatic cut-off by the force of vapor accumulated below the surface of the liquid under said accumulator acting in one direction and by the force of gravity acting in the other direction, substantially as shown and described.

CARROLL L. RIKER.

Witnesses:
L. BACON,
H. C. HUNTEMANN.